Sept. 2, 1930.	M. LOUGHEAD	1,774,984
PROCESS AND APPARATUS FOR CONSTRUCTING NONEXPANSIBLE HOSE
Filed May 27, 1927	2 Sheets-Sheet 1
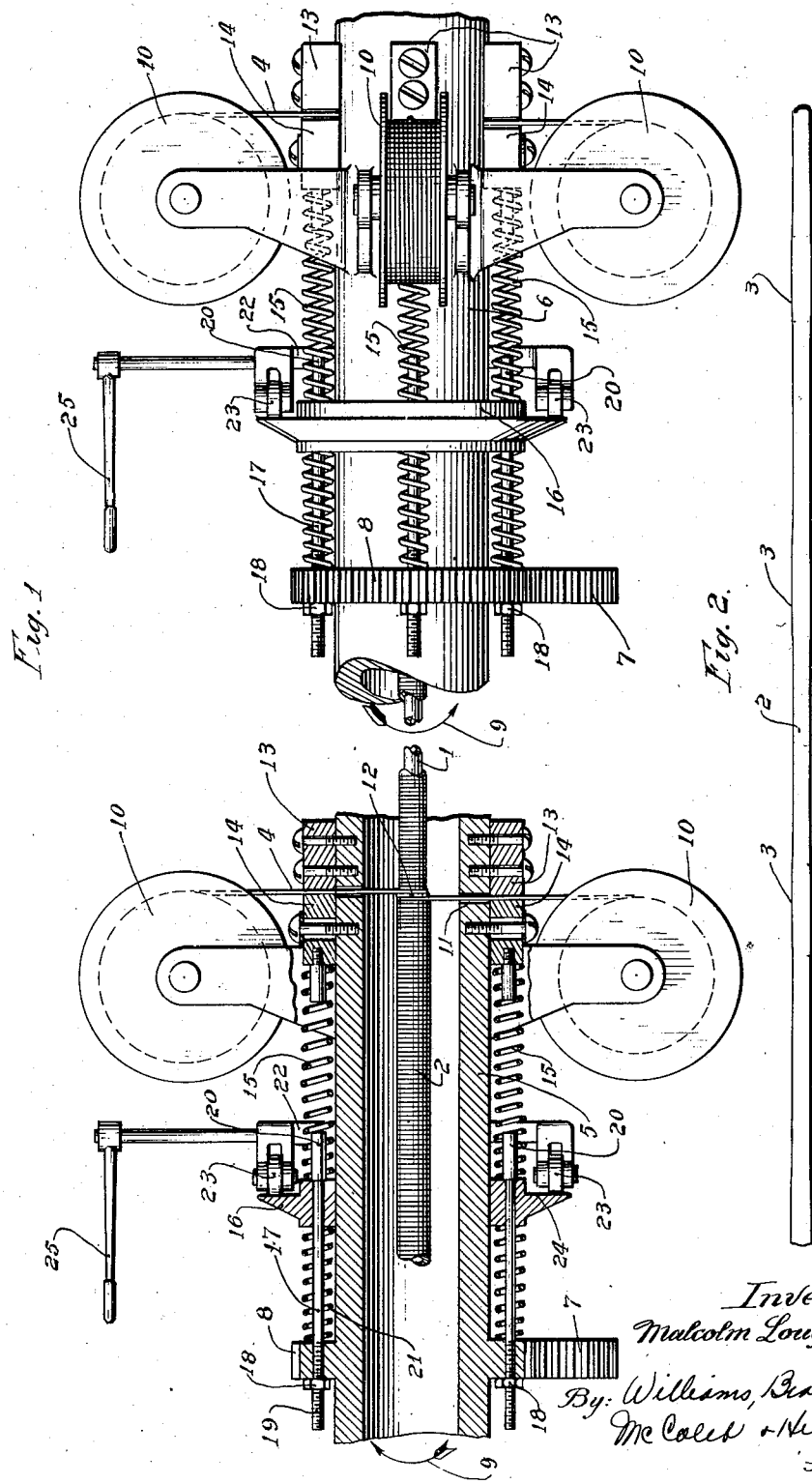
Inventor:
Malcolm Loughead.
By: Williams, Bradbury,
McCaleb & Hinkle
Atty's Sept. 2, 1930.   M. LOUGHEAD   1,774,984
PROCESS AND APPARATUS FOR CONSTRUCTING NONEXPANSIBLE HOSE
Filed May 27, 1927   2 Sheets-Sheet 2

Inventor:
Malcolm Loughead
By Williams, Bradbury,
McCaleb & Hinkle
Atty's

Patented Sept. 2, 1930

1,774,984

UNITED STATES PATENT OFFICE

MALCOLM LOUGHEAD, OF DETROIT, MICHIGAN, ASSIGNOR TO HYDRAULIC BRAKE COMPANY, OF DETROIT, MICHIGAN, A CORPORATION OF CALIFORNIA

PROCESS AND APPARATUS FOR CONSTRUCTING NONEXPANSIBLE HOSE

Application filed May 27, 1927. Serial No. 194,702.

My invention relates to method and apparatus for constructing non-expansible hose and, more particularly, to that type of hose employed in a fluid pressure system of hydraulic brake mechanism.

It is desirable in high pressure fluid systems, such as that employed in hydraulic brake mechanism, to use flexible hose which is non-expansible. Experiment has proven that a flexible hose constructed of gum dipped core, formed by winding successive layers of cord and imbedding material upon a mandrel, is most efficient for this purpose.

This hose is preferably constructed in long sections which are cut up to lengths of the proper size. These lengths are then provided with metal connecting members for their connection with the various parts of the brake system. That portion of the hose length, to which the metal connectors are secured—namely, the ends of the hose length—must be expanded slightly by mechanical means in order to insure secure and permanent fastening of the metal connectors thereto.

An object of this invention is to provide a method and apparatus for constructing nonexpansible hose in which these portions of the individual lengths possess a slight degree of expansibility whereas the major portion of the lengths is substantially non-expansible.

A further object of the invention is to provide a method, as set forth, in which the degree of expansibility of those portions of the hose at the ends thereof may be uniformly maintained. Thus all of the sections possess the same characteristics and all possibility of rupture to the hose, by mechanical expansion at the end portions, is eliminated.

In the accompanying drawings, I have illustrated the apparatus employed in carrying out the method.

Fig. 1 is a side elevation, a part thereof in section of the multihead winding machine employed for constructing the hose.

Fig. 2 is a view of a part of one of the completed hose sections as it is received from the winding machine.

Figure 4:
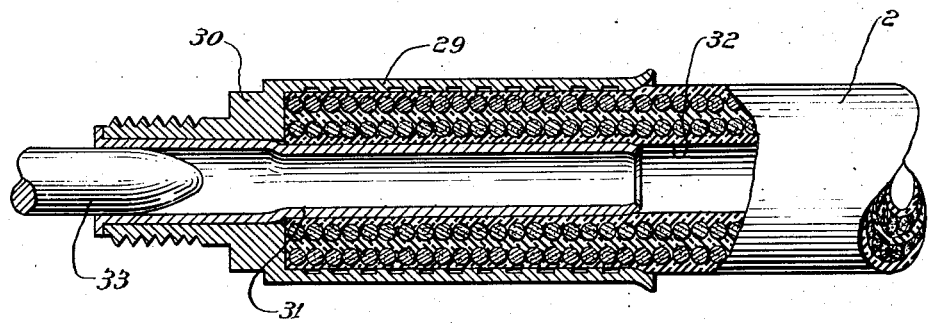
Figs. 4 and 5 illustrate successive steps in the fastening of the metal connector to the hose length.

Referring now to Fig. 1, I have illustrated a special type of winding machine for winding the successive layers of cord and imbedding material upon a mandrel 1, about which the hose 2 is formed. Mandrel 1 is usually about 50 feet in length so that a relatively large number of connected hose lengths are constructed at one time.

My improved method contemplates the construction of the hose section in such a manner as to provide portions thereof, as shown at 3 (see Fig. 2), in which the cord 4, constituting the reinforcement for the hose, is wound with less tension than the larger portion of the hose. It is therefore possible to subject the portions 3 to pressure from within, sufficient to expand the portion slightly and fix a metal connector thereto in a manner hereinafter described, whereas such an act would rupture a hose wound to that tension with which the remaining part of the hose is constructed.

The machine consists chiefly in a pair of revolving heads 5 and 6 which are driven by driving gears 7 in mesh with gear teeth 8 concentric with the head in opposite directions, as shown by the arrows 9. Each of the heads has four reels 10 of gum dipped cord 4 rotatably mounted thereupon. The cords 4 extend through openings 11 through the heads so that they may be wrapped around the mandrel 1, as shown at 12, as the heads revolve. The mandrel 1 is moved along its longitudinal axis, which axis is common to the axis of the heads 5 and 6, by any suitable means.

Means for establishing sufficient tension of the cords 4, as they are wrapped about the mandrel to preclude expansion of the finished hose, is provided in blocks 13 secured to the outer walls of the heads, over one face of which the cords move.

A spring pressed shoe 14 is provided for each of the blocks 13 and is movable longitudinally toward the blocks. Each of the shoes is provided with a compression spring 15 abutting the rear face of the shoe at one end and abutting the adjacent face of an annular ring 16 which is movable laterally along the axis of the head.

Means for normally maintaining the rings 16 in the position shown in Fig. 1 is provided in rods 17 projected through the gear portion 8 of the head and provided with a nut 18 on the outermost threaded portion 19 thereof. The opposite ends of the rods 17 are projected through openings in the ring 16 and have enlargements 20 on the end thereof against which the ring 16 abuts and is there held by compressions springs 21 concentric with the rods 17 bearing upon the gear portion 8 at one end and the ring 16 at the other. The springs 21 are necessarily stronger than the springs 15. The tension exerted by the shoes 14 upon the cords 4 is therefore, under normal conditions, proportional to the force exerted by the springs 15. The springs 21, at no time, take any part in the determination of tension of the shoes 14.

Means for relieving shoe tension and consequently reducing a tension of the cords 4 is provided in a yoke 22 for each head, having small wheels 23 at the outer ends of the bifurcated portions which engage with those facings 24 of the rings 16 opposed to the springs 21. The yoke members 22 are moved by hand levers 25 actuated by the machine operator.

It is thus possible, at will, to move the levers 25 a predetermined degree so as to cause the rings 16 to move against the tension of the springs 21 and thus reduce the force exerted by the springs 15 upon their associate shoes 14. This is done during the windings of those portions of the hose section illustrated at 3 in Fig. 2, which represent the connected end portions of successive individual hose lengths.

In carrying out the method, an operator stands by the machine with his hands upon the levers 25 and watches the progress of the mandrel with its partially completed hose length, as it moves longitudinally. At predetermined intervals, corresponding to the desired length of the individual hose lengths, he will move the levers 25 to slightly relieve the tension exerted by the shoes 14. This step results in the short portions 3 of the hose 2 being wound with less tension than the major portion.

The hose section 2 is then cut up by severing the section at the mid-point of the sections 3.

Figure 3:
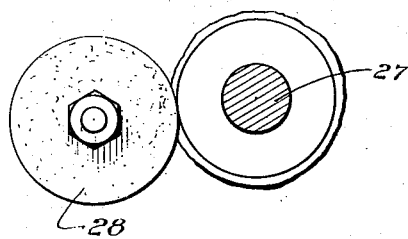
Fig. 3 illustrates a subsequent step in preparing the end of a single hose length for its metal connector.

The next step in the method (see Fig. 3) consists in grinding the outer face of the end section of the hose length, while it is on a revolving mandrel 27, by means of a grinding wheel 28.

Thus the bore of the hose is exactly concentric with the outer finished wall. The hose length is then inserted with its end portion within a metal sleeve 29 forming a part of a rigid metal connector 30.

An expansible metal sleeve 31, having an outside diameter equivalent to the inside diameter of the finished hose, is then inserted through the connector member 30 within the bore 32 of the hose.

Figure 5:
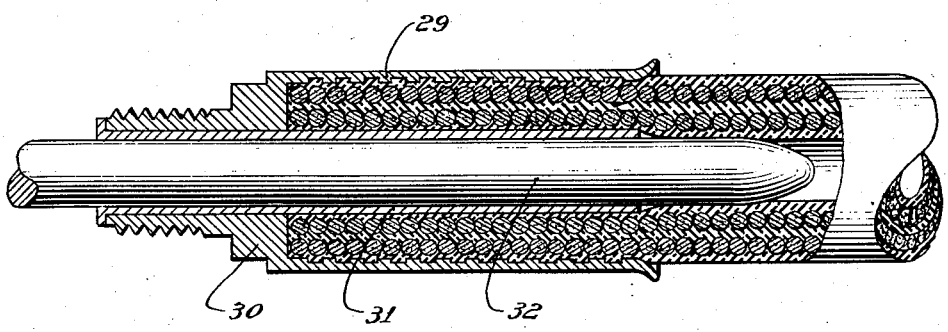

A piston 33, having an external diameter equivalent to the internal diameter of the normal hose bore 2, is then projected through the sleeve 31 (see Fig. 5) to expand the sleeve 31 and consequently expand the end portion of the hose which, by its construction, has been rendered slightly expansible.

This last step causes the hose to become tightly fixed against movement with respect to the sleeves 29 and 31 and the connector is thus securely held in place without rupture or damage to any portion of the hose.

Having thus described my invention, what I claim as new and desire to secure by Letter Patent of the United States is:

1. A method for constructing non-expansible hose which consists in forming the major portion of the hose by winding successive layers of non-elastic cords and suitable embedding materials upon a mandrel with sufficient tension to render that portion of the hose non-expansible and in winding the cord at the end portions of the hose with less tension to render the end portions slightly expansible.

2. A method for constructing non-expansible hose which consists in forming the major portion of the hose by winding a non-elastic cord and suitable embedding material upon a mandrel with sufficient tension to render that portion of the hose non-expansible and in winding the cord at the end portions of the hose with less tension to render the end portions slightly expansible.

3. A method for constructing non-expansible hose which consists in forming the major portion of the hose by winding under tension non-elastic material provided with suitable imbedding material upon a mandrel, relieving the tension of the non-elastic material at regular intervals throughout the length of the section formed, and severing the section into a plurality of individual hose lengths at the medial points of the portions of lesser tension.

4. The method of constructing a flexible non-expansible hose which consists in forming a part of said hose of flexible material in a predetermined manner to render said part substantially non-expansible, forming a second and integral part of said hose in a different manner to provide a predetermined degree of expansibility, and thereafter expanding said expansible part said predetermined amount thereby to render the entire hose permanently non-expansible.

5. A non-expansible hose comprising a tube of flexible material including a first part substantially non-expansible and a second part having a predetermined degree of expansibility, and mechanical means maintaining said second part expanded said predetermined degree.

In witness whereof, I hereunto subscribe my name this 18th day of May, 1927.

MALCOLM LOUGHEAD.